United States Patent
Min et al.

(10) Patent No.: US 7,539,692 B2
(45) Date of Patent: May 26, 2009

(54) METHOD OF PERFORMING QUERIABLE XML COMPRESSION USING REVERSE ARITHMETIC ENCODING AND TYPE INFERENCE ENGINE

(75) Inventors: Jun-Ki Min, Taejon (KR); Myung-Jae Park, Seoul (KR); Chin-Wan Chung, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 428 days.

(21) Appl. No.: 10/860,292

(22) Filed: Jun. 3, 2004

(65) Prior Publication Data
US 2005/0086639 A1    Apr. 21, 2005

(30) Foreign Application Priority Data
Oct. 21, 2003    (KR)    ............... 10-2003-0073453

(51) Int. Cl.
*G06F 17/30*    (2006.01)
(52) U.S. Cl. .............. 707/101; 717/114; 717/136; 707/513
(58) Field of Classification Search .......... 707/513, 707/101; 719/328; 717/136, 114
See application file for complete search history.

(56) References Cited

U.S. PATENT DOCUMENTS

| | | | |
|---|---|---|---|
| 6,635,088 B1 * | 10/2003 | Hind et al. ............... 715/236 |
| 6,711,740 B1 | 3/2004 | Moon et al. |
| 6,850,948 B1 * | 2/2005 | Krasinski ............... 707/101 |
| 7,054,953 B1 * | 5/2006 | Nakajima ............... 709/246 |
| 7,158,990 B1 * | 1/2007 | Guo et al. ............... 707/102 |
| 2002/0038320 A1 * | 3/2002 | Brook ............... 707/513 |
| 2003/0158854 A1 * | 8/2003 | Yoshida et al. ............... 707/101 |
| 2004/0143791 A1 * | 7/2004 | Ito et al. ............... 715/513 |

OTHER PUBLICATIONS

Tolani et al."XGrind: a Query-Friendly XML Compressor", 2002, Data Engineering, 2002, 225-234.*
Nori et al. "Using Hardcode Hedge Automata for Compressing Structured Documents", Technical Report No. TR-IISc-CSA-2002-1, Jul. 2002.*
An article entitled "XPRESS: A Queriable Compression for XML Data", By Min et al., published Jun. 2003, pp. 122-133.

* cited by examiner

*Primary Examiner*—Charles Rones
*Assistant Examiner*—Yuk Ting Choi
(74) *Attorney, Agent, or Firm*—Bachman & LaPointe, P.C.

(57) ABSTRACT

A method and apparatus for performing queriable XML compression and queries related to a compressed XML document are disclosed. In the method, information, including at least the frequencies of the respective tags of XML data, the type information of data values and data value-related statistical information is collected. Thereafter, the type information of data values of elements is inferred according to tags using an automatic data type inference engine algorithm. Reverse arithmetic encoding is performed on the tags and paths of elements. The data values are encoded based on the inferred type information.

11 Claims, 11 Drawing Sheets

Procedure Type_Inferencing(Token, Pathstack, Elemhash)
begin
1.   Tag := Pathstack.top()
2.   eleminfo := Elemhash.hash(Tag)
3.   type := Infer_Type(Token)
4.   switch(eleminfo.*inferred_type*) {
5.      case *undefined* :
6.      case *integer* :
7.         if(type = *integer*){
8.            eleminfo.*inferred_type* := *integer*
9.            intvalue := get_IntValue(Token)
10.           eleminfo.*min* := MIN(eleminfo.min, intvalue)
11.           eleminfo.*max* := MAX(eleminfo.man, intvalue)
12.           eleminfo.*symhash*.insert(Token)
13.           eleminfo.accumulate_chars_frq(Token)
14.        }
15.        else if (type == *float*){
16.           eleminfo.*inferred_type* := *float*
17.           floatvalue := get_FloatValue(Token)
18.           eleminfo.*min* := MIN(eleminfo.min, floatvalue)
19.           eleminfo.*max* := MAX(eleminfo.man, floatvalue)
20.           eleminfo.*symhash*.insert(Token)
21.           eleminfo.accumulate_chars_frq(Token)
22.        }
23.        else { // *string*
24.           eleminfo.symhash.insert(Token)
25.           if(the number of entries in eleminfo.*symhash* < 128) {
26.              eleminfo.*inferred_type* := *enumeration*
27.           }else eleminfo.*inferred_type* := *string*
28.           eleminfo.accumlate_chars_frq(Token)
29.        }
30.        break
31.     case *float* :
32.        if(type = *integer* or type = *float*){
33.           eleminfo.*inferred_type* := *float*
34.           floatvalue := get_FloatValue(Token)
35.           eleminfo.*min* := MIN(eleminfo.min, floatvalue)
36.           eleminfo.*max* := MAX(eleminfo.man, floatvalue)
37.           eleminfo.*symhash*.insert(Token)
38.           eleminfo.accumulate_chars_frq(Token)
39.        }
40.        else { // *string*
41.           eleminfo.symhash.insert(Token)
42.           if(the number of entries in eleminfo.*symhash* < 128) {
43.              eleminfo.*inferred_type* := *enumeration*
44.           }else eleminfo.*inferred_type* := *string*
45.           eleminfo.accumlate_chars_frq(Token)
46.        }
47.        break
48.     case *enumeration* :
49.        ...
50.        break
51.     case *string* :
52.        eleminfo.accumlate_chars_frq(Token)
53.        break
54. }
end

FIG. 2

```
<book>
   <author> author1 </author>
   <title> title1 </title>
   <section>
      <title> title2 </title>
      <subsection>
         <subtitle> title3 </subtitle>
         ...
      </subsection>
   </section>
</book>
```

FIG. 3

| element | frequency | cumulative frequency | Interval$_T$ |
| --- | --- | --- | --- |
| *book* | 0.1 | 0.1 | [0.0, 0.1) |
| *author* | 0.1 | 0.2 | [0.1, 0.2) |
| *title* | 0.1 | 0.3 | [0.2, 0.3) |
| *section* | 0.3 | 0.6 | [0.3, 0.6) |
| *subsection* | 0.3 | 0.9 | [0.6, 0.9) |
| *subtitle* | 0.1 | 1.0 | [0.9, 1.0) |

FIG. 4

Function reverse_arithmetic_encoding($P = p_1 \ldots p_n$)
begin
1.   $[min_e, max_e) := $ Interval$_{p_n}$
2.   if(n = 1) return $[min_e, max_e)$
3.   length $:= max_e - min_e$
4.   $[min_Q, max_Q) := $ reverse_arithmetic_encoding($p_1 \ldots p_{n-1}$)
5.   $min_e := min_e + $ length* $min_Q$
6.   $max_e := min_e + $ length* $max_Q$
7.   return $[min_e, max_e)$
end

FIG. 5

| element | simple path | Interval$_T$ | subinterval |
|---|---|---|---|
| *book* | *book* | [0.0, 0.1) | [0.0, 0.1) |
| *section* | *book.section* | [0.3, 0.6) | [0.3, 0.33) |
| *subsection* | *book.section.subsection* | [0.6, 0.9) | [0.69, 0.699) |

FIG. 6

| Encoder | Description |
|---------|-------------|
| u8 | encoder for integers where max-min< $2^7$ |
| u16 | encoder for integers where $2^7$ <=max-min< $2^{15}$ |
| u32 | encoder for integers where $2^{15}$ <=max-min< $2^{31}$ |
| f32 | encoder for floating values |
| dict8 | dictionary encoder for enumeration typed data |
| huff | huffman encoder of textual data |

FIG. 8

| Query name | Query definition |
|---|---|
| B1 | /SEASON/LEAGUE/DIVISION/TEAM/PLAYER/GIVEN_NAME |
| B2 | //TEAM/PLAYER/SURNAME |
| B3 | /SEASON/LEAGUE//TEAM/TEAM_CITY |
| B4 | /SEASON/LEAGUE//TEAM[TEAM_CITY >= Chicago and TEAM_CITY <= Toronto] |
| C1 | /root/course/selection/session/place/building |
| C2 | //session/time |
| C3 | /root/course//session/time/start_time |
| C4 | /root/course//session/time[start_time >= 800 and start_time <= 1200] |
| S1 | /PLAY/ACT/SCENE/SPEECH/STAGEDIR |
| S2 | //PGROUP/PERSONA |
| S3 | /PLAY/ACT//SPEECH/SPEAKER |
| S4 | /PLAY/ACT//SPEECH[SPEAKER>= CLEOPATRA and SPEAKER <= PHILO] |

FIG. 10

METHOD OF PERFORMING QUERIABLE XML COMPRESSION USING REVERSE ARITHMETIC ENCODING AND TYPE INFERENCE ENGINE

BACKGROUND OF THE INVENTION

1. Field of the Invention

The present invention relates generally to an XML compression technique capable of efficiently storing and managing data expressed in extensible markup language (reference: T. Bray, J. Paoli, C. M. Sperberg-McQueen, and E. Maler, extensible markup language 1.0 (second addition). W3C) that is a standard for data representation and exchange on the Internet, and, more particularly, to a compression technique that performs compression using reverse arithmetic encoding and a type inference engine, thus allowing XML queries related to compressed XML data to be directly and efficiently processed.

2. Description of the Related Art

EXtensible Markup Language (XML) data is a collection in which the elements, each of which is expressed with a start tag and an end tag, are hierarchically nested. To search such XML data, XML query languages, such as XPath (reference: J. Clark and S. DeRose, XML path language (XPath) version 1.0, W3C) and XQuery (S. Boag, D. Chamberlin, M. Fernandez, D. Florescu, J. Robie, J. Simeon, and M. Stefanescu, Xquery 1.0: An XML query language, W3C), were proposed. Such query languages are based on path expressions consisting of the tags of XML data so as to search irregular XML data. Accordingly, it is important to support path expressions related to XML data.

Data compression techniques are divided into lossy compression and lossless compression according to data decompression capability. The conventional XML data compression techniques include XMill (reference: H. Liefke and D. Suciu, XMill: An Efficient Compressor for XML Data, ACM SIGMOD 2000) and XGrind (reference: P. M. Tolani and J. R. Haritsa, XGRIND: A Query-friendly XML Compressor, IEEE ICDE 2002).

XMill is a compression technique for minimizing the size of compressed XML data, and does not support the performance of queries related to compressed XML data. XMill manages the tags and attribute names of XML data, with the tags and the attribute names being physically separated from the data values thereof. Accordingly, the structure of compressed XML data is different from that of original XML data. Respective data values are classified according to the tags of corresponding elements, and stored in a data structure that is called a container. In this case, a user can classify data values in detail using path expressions. Furthermore, the tags and attribute names of XML data are compressed using a dictionary encoding technique. If there is a user defined encoding technique for a corresponding container, data values stored in the container are compressed using the user defined encoding technique. In this case, the dictionary encoding technique is a technique of assigning an integer value to each of the words of input data and replacing the words with unique integer values. Finally, the data is compressed once more using zlib that is well known as a data compression library. In this case, data values have been classified according to tags, so that the data values are similar in terms of syntax or semantics, thus exhibiting a superior compression ratio. However, there is a disadvantage in that data must be decompressed to perform queries.

XGrind is an XML compressor for supporting the performance of direct queries related to compressed XML data, and is a homomorphic compression technique in which compressed XML data maintains the structure of original XML data, unlike XMill. In XGrind, data values are compressed using Huffman encoding (reference: D. A. Huffman, A Method for the Construction of Minimal Redundancy Codes, The Institute of Radio Engineering, 1995) or dictionary encoding, while tags and attribute names are compressed using dictionary encoding. XGrind determines whether Huffman encoding or dictionary encoding is applied to the data value of an element having a certain tag, using a Document Type Definition (DTD) indicating information about the structure of XML data.

To process path expressions in XGrind, there is a burden of a query processor detecting a path from a root element to a corresponding element, that is, a sequence of tags, and examining whether the path meets a path expression whenever visiting each element. To perform a range query of searching for elements having certain ranges of data values, partial data decompression for the data values is required. The reason for this is that, when Huffman encoding or dictionary encoding is applied, the results of size comparison between encoded values may deviate from original data values.

SUMMARY OF THE INVENTION

Accordingly, an object of the present invention is to provide a method and apparatus for solving the problems of the prior art.

Another object of the present invention is to provide a scheme for efficiently supporting the storage, search and exchange of XML data, which achieves effects, such as the conservation of disc space and the reduction of a bandwidth for data transmission, by compressing XML data, eliminates a burden of maintaining paths from a root element to other elements at the time of processing path expressions by providing a reverse arithmetic encoding technique of compressing the path information of elements existing on XML data, and automatically applies a data compression technique suitable for each data value using an inference engine for obtaining the type information of data values.

In order to accomplish the above object, the present invention provides a method of performing queriable XML compression and queries related to a compressed XML document, including collecting information, including at least the frequencies of the respective tags of XML data, the type information of data values and the statistical information related to the data values; inferring the type information of data values of elements according to tags using an automatic data type inference engine algorithm; performing reverse arithmetic encoding on the tags and paths of elements; and encoding data values based on the inferred type information.

In addition, the present invention provides an apparatus An XML compression apparatus, including a statistics collection unit for collecting information, including at least the frequencies of the respective tags of XML data, the type information of data values, and data value-related statistical information; a type inference engine unit for inferring the type information of the data values of elements according to tags using an automatic data type inference engine algorithm; a reverse arithmetic encoding unit for performing reverse arithmetic encoding on the tags and paths of elements; and a type dependent encoding unit for encoding the data values based on the inferred type information.

BRIEF DESCRIPTION OF THE DRAWINGS

The above and other objects, features and advantages of the present invention will be more clearly understood from the following detailed description taken in conjunction with the accompanying drawings, in which:

FIG. 2 shows the algorithm of an automatic data type inference engine that infers the type information of data values existing on XML data in accordance with an embodiment of the present invention;

FIG. 3 is a view showing an example of XML data;

FIG. 4 is a view showing an example in which the range [0.1, 1.0) is divided according to tags so as to apply a reverse arithmetic encoding technique in accordance with an embodiment of the present invention;

FIG. 5 is a view showing the algorithm of the reverse arithmetic encoding technique in accordance with an embodiment of the present invention;

FIG. 6 is a diagram showing en example of converting a path into an interval using the reverse arithmetic encoding technique;

FIG. 8 is a diagram showing six type dependent encoders for compressing data values, which are provided in the type dependent encoding unit;

FIG. 10 is a table showing various queries for the measurement of query performance.

DESCRIPTION OF THE PREFERRED EMBODIMENTS

Figure 1:
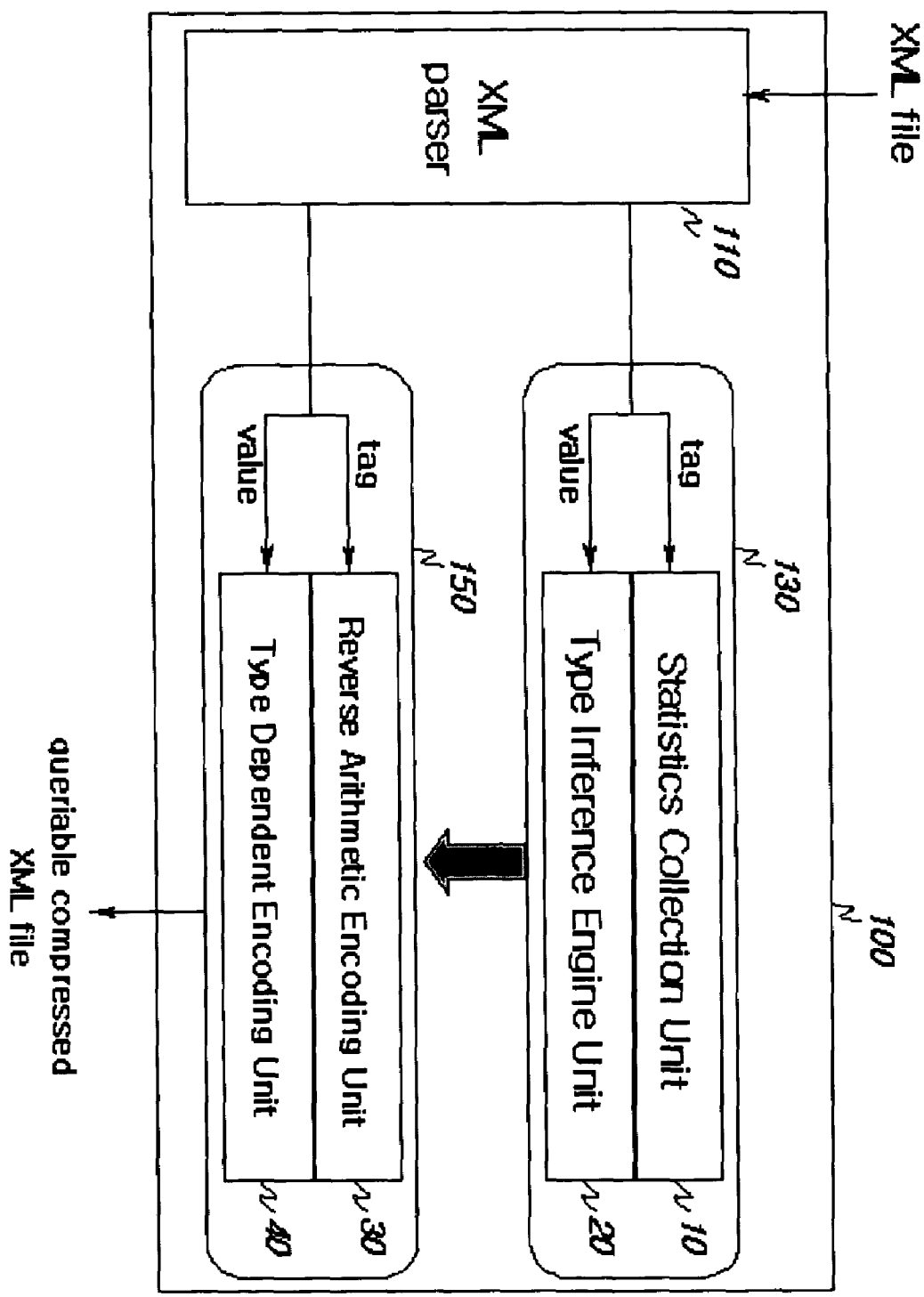
FIG. 1 is a diagram showing the construction of an XML compression apparatus in accordance with an embodiment of the present invention.

The present invention provides a scheme of performing queriable XML compression, which includes reverse arithmetic encoding for compressing the paths of elements and attributes existing on XML data, an inference technique for automatically inferring the types of data values existing on XML data, the application of various encoding techniques based on inferred types, and a scheme of processing queries related to compressed XML data.

Specifically, a method of performing queriable XML compression and a method of processing queries related to XML data utilizes the following principles.

(1) Since conventional XML compression techniques are inefficient in processing path expressions related to compressed XML data because the tag of each element is compressed through the use of dictionary encoding. In the present invention, the path of each element is converted into an interval distinct on the range [0.0, 1.0) through the use of reverse arithmetic encoding. Furthermore, a path expression is converted into an interval on the range [0.0, 1.0) through the use of reverse arithmetic encoding. In this case, path expressions can be efficiently processed using the containment relationship between the interval of the path expression and the interval of the path of the element.

(2) An effective compression technique differs according to the type of a data value. However, in the case of XMill, a user defines the types of data values, and, in the case of XGrind, data values are compressed using only Huffman encoding and dictionary encoding, with the data values fixed to a string type. According to the present invention, a scheme of automatically inferring the types of data values without the user's intervention is devised.

(3) A high compression ratio can be obtained by applying an appropriate encoding technique to data values according to an inferred data type. A burden of a partial data decompression occurring at the time of processing a range query is reduced by applying an encoding technique in which binary encoding and differential encoding are combined together to a data value that is inferred to be an integer or float type.

Furthermore, a compression method according to the present invention is a method for compressing XML data in text form, and belongs to a lossless compression technique. The compression of the present method is referred to "XPRESS" to be differentiated from XMill and XGrind.

Preferred embodiments of the present invention are described with reference to the accompanying drawings below. It should be noted that the same reference numerals are used throughout the different drawings to designate the same or similar components. In the below description of the embodiments, if it is determined that detailed descriptions of related well-known functions and constructions may obscure the gist of the present invention, the detailed descriptions are omitted.

FIG. 1 is a diagram showing the construction of an XML compression apparatus in accordance with an embodiment of the present invention.

As shown in FIG. 1, a queriable compressor 100 includes three principal modules, that is, an XML parser 110, an XML analyzer 130 and an XML encoder 150.

The XML parser 110 functions to sequentially output the syntax elements (tags, attribute names and data values) of XML data from an input XML file. The present invention adopts a method of scanning XML data twice. In the first scanning, the XML analyzer 130 is operated. The XML analyzer 130 functions to collect information used in the XML encoder 150, and the XML encoder 150 compresses given XML data and outputs queriable compressed XML data. In the second scanning, the XML encoder 150 is operated, the tags of the data are provided to a reverse arithmetic encoding unit 30, and the values of the data are provided to a type dependent encoding unit 40.

As shown in FIG. 1, the XML analyzer 130 includes a statistics collection unit 10 and a type inference engine unit 20. In this case, the statistics collection unit 10 functions to collect the frequency of each tag existing in given XML data. The frequency of each tag is recorded on a hash table called Elehash, which is a data structure for maintaining information related to each tag existing on a XML document. The entries constituting the hash table have fields capable of recording tags, the frequencies of tags, the types of elements having corresponding tags, and statistical information related to data values (minimum values, maximum values, individual data values and the frequencies of respective characters). The frequencies of respective tags are used as statistical information in the reverse arithmetic encoding unit 30 of the XML encoder 150, and the type information and statistics of data values are used as statistical information in the type dependent encoding unit 40 of the XML encoder 150.

The type inference engine unit 20 functions to infer the type information of the data values of elements having corresponding tags.

FIG. 2 shows the algorithm of an automatic data type inference engine that infers the type information of data values. Token, Pathstack and Elemhash are used as inputs to the algorithm shown in FIG. 2. Token is input from the XML parser 110 and is a value existing on XML data, and Pathstack maintains a path from a root element to a currently visited element, that is, a sequence of tags, using a stack that is a data structure. The tag information of an element having a data value is located at the top of the Pathstack. This Pathstack can be simply managed in such a way as to put a corresponding tag into the Pathstack when a start tag is received from the XML parser 110 and draw the tag when an end tag is met. Elemhash is the above-described data structure, and can search for a necessary entry in the Elemhash using the tag situated at the top of the Pathstack.

Basically, the type inference engine unit 20 inductively infers the types of data values depending on each tag. The type information of each entry of the Elemhash is initialized as undefined, which is changed by examining each data value. As understood from FIG. 2, Token, that is, the type of a data value, is inferred. In this case, when each of characters constituting Token is one of '0'~'9' and a first character is not '0', Token is inferred to be an integer type. When each of characters constituting Token is '0'~'9' or '.', '.' appears once, and first and second characters are '0' and '.' (that is, 0.dddd) or the first character is not '0' (that is, ddd.dddd), Token is inferred to be a real number. In other cases, token is inferred to be a string type. Furthermore, the inferred type is changed to a new type according to type information inferred up to now and the type of a data value. The code of the line 49 of FIG. 2 is the same as that of the lines 24 to 28. The type of each tag inferred through the type inference algorithm of FIG. 2 is one of integer, real number, enumeration and string types. According to the basic principle of the present algorithm, when the types of all data values related to a specific tag are integers, the type of the tag is inferred to be an integer type. When the types are integers and real numbers, the type of the tag is inferred to be a real number type. In other cases, the type of the tag is inferred to be an enumeration or a string type. The difference between the enumeration type and the string type is that if the number of the distinct values of data values is smaller than 128, the type of the tag is inferred to be an enumeration type, and otherwise, the type of the tag is inferred to be a string type. In this case, the integer or real number type has the minimum and maximum values of corresponding data values as statistics. The enumeration type has distinct values as statistics. The string type has the frequencies of respective characters as statistics. Such statistics are used as inputs to the XML encoder 150.

As shown in FIG. 1, the XML encoder 150 includes a reverse arithmetic encoding unit 30 for encoding the tags and paths of elements and a type dependent encoding unit 40 for encoding data values. In this case, the type dependent encoding unit 40 includes a plurality of type dependent encoders.

The reverse arithmetic encoding technique executed in the 15 reverse arithmetic encoding unit 30 follows the sequence of (1), (2) and (3).

(1) A range [0.0, 1.0) is divided into subintervals.

Each of the subintervals represents a tag existing on an XML document, and the length of a corresponding interval is proportional to the frequency of each tag obtained by the statistics collection unit 10 of the XML analyzer 130. It is assumed that a subinterval corresponding to a certain tag T is interval$_T$. For example, when XML data shown in FIG. 3 exists, it is assumed that the frequencies of the tags (={book, author, title, section, subsection, subtitle}) of the XML data are {0.1, 0.1, 0.1, 0.3, 0.3, 0.1}, respectively. In this case, the range [0.0, 1.00) is divided as shown in FIG. 4.

(2) The path of a certain element e, $P=_{P1.\ldots .Pn}$, is converted into an interval [min$_e$, max$_e$] using the algorithm shown in FIG. 5 (hereinafter referred to as "path conversion algorithm").

In this case, it can be understood that the tag of the element e is $p_n$. Basically, the algorithm shown in FIG. 5 reduces Interval$_{Pn}$ for the tag$_{Pn}$ using the interval for the path $Q=_{P1.\ldots .Pn-1}$. If it is assumed that the interval for the path P' is [min$_Q$, max$_Q$] in the total range [0.0, 1.0), the interval for the path P, [min$_e$, max$_e$], is reduced in proportion to [min$_Q$, max$_Q$]. For example, the interval [0.69, 0.699) of the path book.section.subtitle of a first subtitle element shown in FIG. 3 is obtained through a step shown in FIG. 6. The following relationship exists between paths created using the reverse arithmetic encoding technique.

Property 1

When a certain path $P=_{P1.\ldots .Pn}$ is converted into an interval I, the intervals for all possible $P'=_{P1.\ldots .Pn}$ (1<=i<=n) include the interval I.

For example, the interval [0.6, 0.9) for the path subsection and the interval [0.69, 0.78) for the path section.subsection include the interval [0.69, 0.699) for the path book.section.subsection. Accordingly, a path expression can be efficiently processed by converting the path expression //section/subsection into the interval [0.69, 0.78) and selecting elements having intervals existing within the interval [0.69, 0.78).

(3) To reduce the size of compressed XML data, the start tag of the element e is replaced with the minimum value of the subinterval created through reverse arithmetic encoding.

In this case, the minimum value of the corresponding subinterval meets the property 1, so that there is no loss of information. Furthermore, when the tag of the element is replaced with the encoding value created through reverse arithmetic encoding, the encoding value created in the reverse arithmetic encoding unit is made to be a value between [1.0, 2.0) by adding 1.0 to the encoding value. In this case, each of the real number values between [1.0, 2.0) is expressed in such a way that a sign bit is 0 and a biased exponent part is 0111 1111 in 32-bit real number representation. Accordingly, the size of a compressed XML data can be reduced by cutting off a first byte in 32-bit real number representation. Furthermore, the last bit of a biased exponent becomes the Most Significant Bit (MSB) of an encoding value for a tag by cutting off the first byte, so that the MSB always is 1. Furthermore, to improve a compression ratio, the last byte is cut off. Path information expressed in real numbers up to $1.0+2^{-23}$ is reduced to $1.0+2^{-15}$ in precision by cutting off the last byte. However, a small amount of disc space is occupied and the number of inputs and outputs into and from a disc can be reduced, thus effectively processing queries. In the processing of path expressions, the path of each element is expressed with a precision of $1.0+2^{-15}$, so that a path expression is divided into sub-path expressions having a precision of $1.0+2^{-15}$ and the sub-path expressions are processed. For example, if a precision higher than $1.0+2^{-15}$ is required for the representation of a path expression $E=//_{P1}/\ldots /_{Pn}$ and a precision equal to or lower than $1.0+2^{-15}$ is required for the representation of a path expression $E'=//_{P1}/\ldots /_{Pi}$ (i<n), E is divided into E' E' ' and E' E' ' are processed, where $E''=//_{Pi+1}/\ldots /_{Pn}$. In this case, if a precision higher than $1.0+2^{-15}$ is required for the representation of E' ', the above-described method is reflexively applied.

FIG. 8 is a diagram showing six type dependent encoders for compressing data values, which are provided in the type dependent encoding unit.

In FIG. 8, u8, u6 and f32 are based on a differential encoding technique for processing numerical data values. Dict 8 and huff are encoders for processing text data values. In this case, the point to be attended to is that the MSB of values created through the encoders for data values always is 0.

The encoders for numerical data convert the numerical values of XML data in character string form into numerical values in binary form using a binary encoder because the numerical values of the XML data are represented in character string form, and compresses resulting numerical values using a differential encoder. The minimum value of statistical values obtained in the type inference engine is used as the reference value of the differential encoder. Accordingly, the size relationship between numerical data is maintained in encoding values created trough the differential encoder, so that a range query using numerical values can be performed on compressed XML data without the decompression of partial data.

Figure 7:
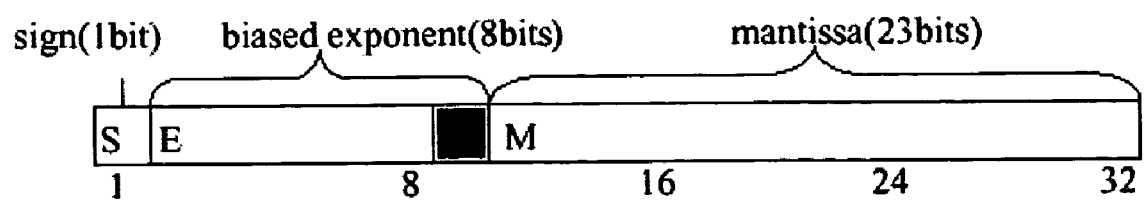
FIG. 7 is a diagram showing IEEE 32-bit floating point representation.

As shown in FIG. 8, u8, u16 and u32 use 7 bits, 15 bits and 31 bits, respectively, and create 1 byte (=8 bits), 2 byte (=16 bits) and 4 bytes (=32 bits), respectively, so that the MSB always is 0. In the case of f32, differential encoding using difference values with respect to the minimum value is used, and a positive real number is always created. In this case, as shown in FIG. 7, a sign bit is 0 in the case of a positive real number, so that the MSB always is 0.

Dict 8 is an encoder for processing enumeration type data, and uses dictionary compression. In this case, since, as for enumeration type data, a maximum of 127 different data values can exist, 7 bits are used and an encoding value of a size of 1 byte is created, so that the MSB is 0. Huff is an encoder for processing general character string data, and creates a variable-length encoding value unlike u8, u16, u32 and dict8. Accordingly, in the present invention, an encoding value through the Huffman encoder, that is, a bit stream, is divided into sub-bit streams of less than 128 bytes and 1 byte is added to the front of each sub-bit stream to indicate the byte length of the sub-bit stream. Accordingly, the length of each sub-bit stream is smaller than 128 bytes, so that the 7 bits of 1 byte indicating the length of a corresponding bit stream are used. Accordingly, the MSB always is 0.

It is necessary at the time of query processing or data decompression whether a value encoded on compressed XML data is for a data value or a tag including path information. As described above, the MSB of encoded values for data values always is 0 and an encoded value for tag information always is 1, so that an encoding value for a tag and an encoding value for a data value can be easily differentiated.

To measure the efficiency of the present invention, experiments were carried out using various XML data and various XML queries. Three types of XML data were used as data for the experiments as follows:

(1) Baseball: Baseball includes statistical information about the players of teams that participated in 1998 Major League. This XML data has statistical information, so that the XML data contains various numerical information and enumeration type data [source: http://www.ibiblio.org/xml/examples/baseball].

(2) Course: Course includes descriptions of courses in the University of Washington in the U.S.A. The XML data contains a small amount of numerical information and a small number of enumeration type data values [source: http://www.cs.washington.edu/research/projects/xmltk/www/xml-properties.html].

(3) Shakespeare: Shakespeare is an XML document that is formed by converting Shakespeare's plays into XML form, and all the data values of Shakespeare are textual values [source: http://www.oasis-open.org/cover/xml.html]

The features of the respective XML data are shown in the following table 1. In this case, to observe the effect of the present invention on a large-sized document, Baseball was magnified 16 times, Course was magnified 4 times, and Shakespeare was magnified 2 times.

TABLE 1

| Data set | Size (Mbytes) | Depth | Tags | Numerical | Enum |
|---|---|---|---|---|---|
| Baseball | 17.06 | 6 | 46 | 19 | 5 |
| Course | 12.28 | 6 | 18 | 5 | 4 |
| Shakespeare | 15.3 | 5 | 21 | 0 | 0 |

To exhibit the compression performance of the present invention, the compression performance of XMill, XGrind, and gzip that is a general compressor was evaluated. A compression ratio is expressed as the following Equation 1.

$$\text{Compression ratio (\%)} = (1 - \text{size of compressed XML document}/\text{size of original XML document}) * 100 \quad (1)$$

Figure 9:
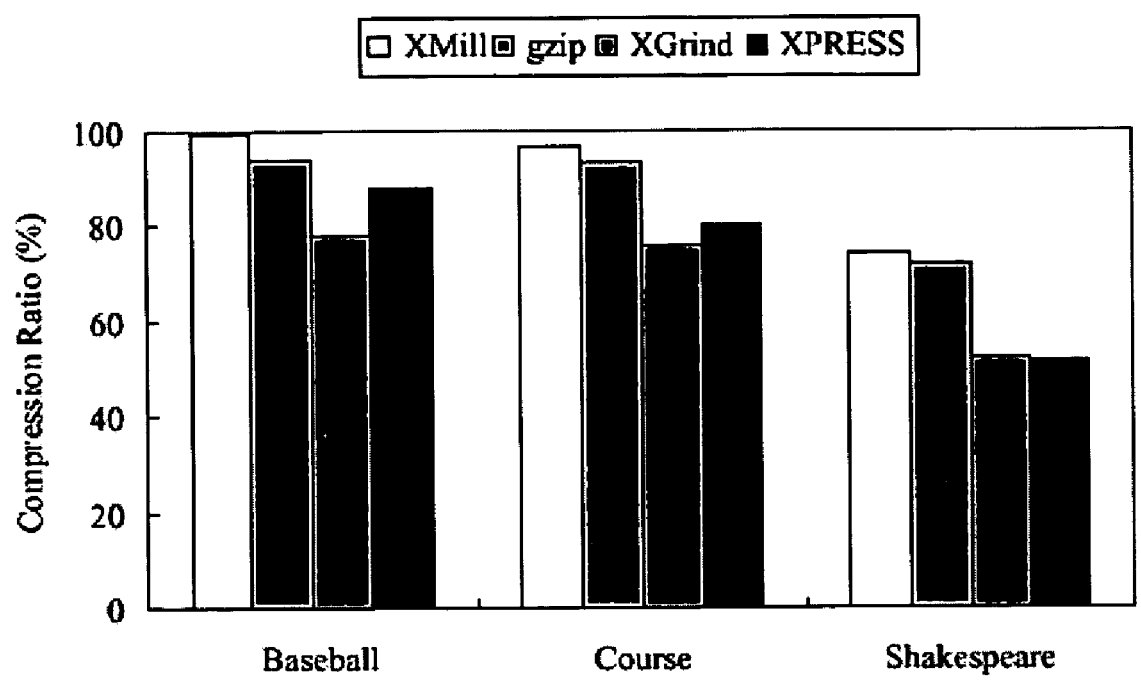
FIG. 9 is a graph showing the compression ratios of XML data.

FIG. 9 shows the compression ratios of respective compressors. As shown in FIG. 9, XMill exhibits the best compression ratio, as described above. The reason for this is that data similar in terms of syntax or semantics are gathered together by grouping data values in accordance with their tags. It can be understood that XPRESS proposed by the present invention exhibits a low compression ratio compared to XMill and gzip while XPRESS exhibits an average of a high compression ratio compared to XGrind that supports queries related to a compressed XML document.

To exhibit query performance related to an XML document, four types of queries were created for each XML data. The respective queries are shown in FIG. 10. The characters of query names of FIG. 10 indicate target XML documents, and the numbers thereof indicate the types of queries. A query type 1 is used to evaluate the performance of a lengthy path expression. A query type 2 indicates a simply partially watching type path expression. A query type 3 is a partially matching type like the query type 2, and a path expression longer and more complicated than the query type 2. A query type 4 is used to evaluate the performance of a range query.

Figure 11:
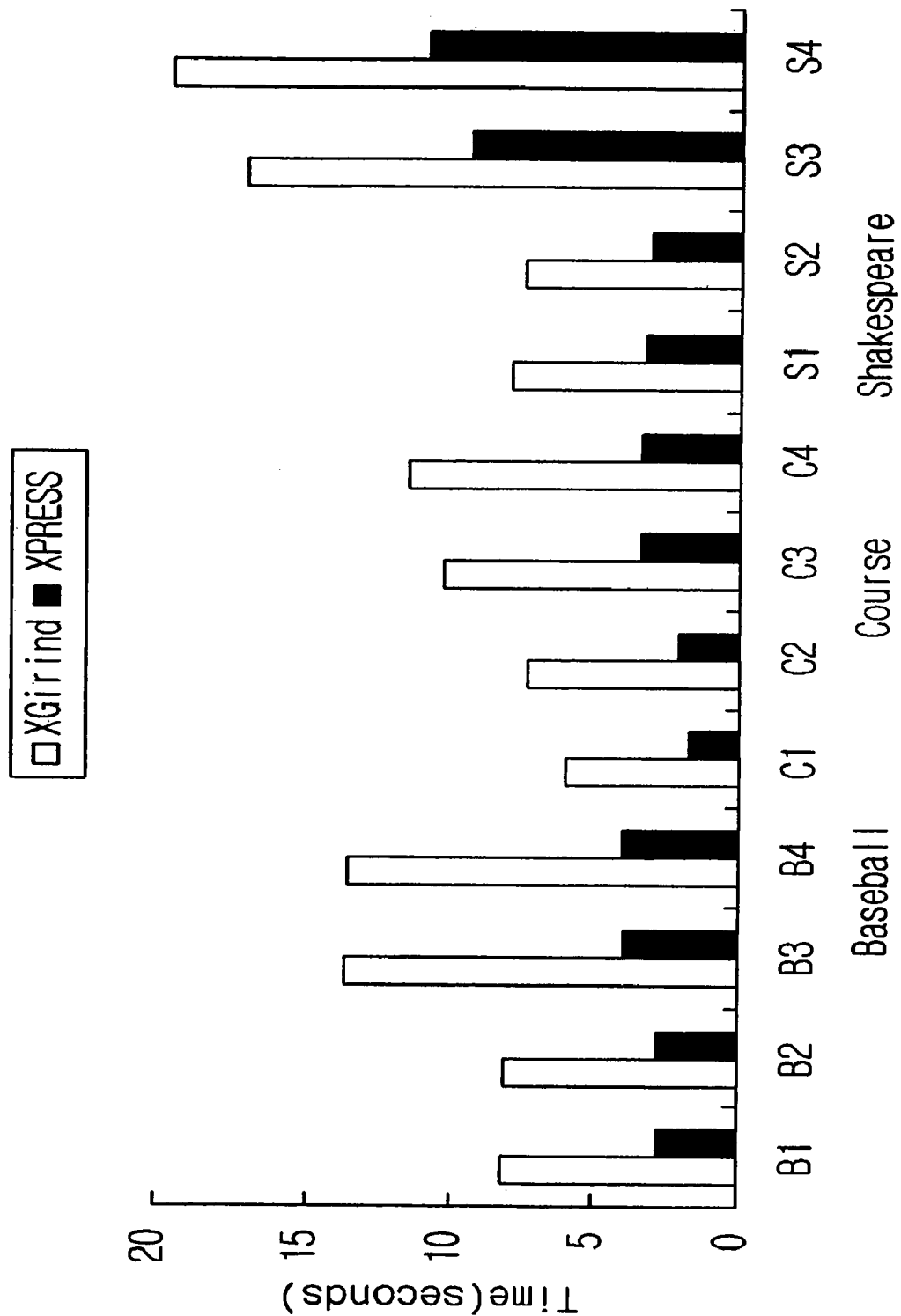
FIG. 11 is a graph showing query performances related to compressed data.

Only XGrind supports the performance of queries on a compressed XML document, so that the evaluation of performance was carried out with respect to the performance of XGrind. FIG. 11 shows the evaluation of query performance related to an XML document compressed using XPRESS proposed in the present invention. As shown in FIG. 11, it can be understood that XPRESS proposed by the present invention exhibits performance 2.83 times that of XGrind. The reason for this is that XPRESS can process a path expression faster than XGrind, with the assistance of reverse arithmetic encoding.

In accordance with the present invention, the direct and efficient performance of queries related to compressed XML data can be supported by using a reverse arithmetic encoding technique and type dependent encoding techniques at the time of compressing XML data. A burden of decompressing partial data is reduced at the time of range queries by inferring the types of respective data values using a type inference engine and applying a compression technique, which allows the size relationship of data values to be maintained, to numerical data (integer or real number type). Accordingly, the present invention can reduce the excessive use of disc space, a burden of query processing and a burden of transmission, so that the present invention is expected to contribute to the fields of XML applications, such as e-commerce and Internet search.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A computer-implemented method of performing queriable XML compression and queries related to a compressed XML document, comprising:
   collecting information, including at least frequencies of respective tags of XML data, type information of data values and data values-related statistical information;
   inferring type information of data values of elements inductively according to tags of the elements having the data values with anyone among integer, real number, enumeration or string using an automatic data type inference engine algorithm without a document type definition of the XML data;
   performing reverse arithmetic encoding on tags and paths of elements;
   encoding the data values based on the inferred type information;
   storing the data values to a computer-readable storage medium; and
   displaying at least one of the following: type dependent encoder, queries and compression ratios,
   wherein a variety of encoding techniques are applied to the compression of the data depending on the inferred data types, and numerical data, including integers and real numbers, are converted into numerical values through a binary encoder and compressed through a differential encoder so that size relationship between the numerical data values is maintained in encoded values, and thus, range queries using the numerical data are performed on the compressed XML data without partial data decompression.

2. The computer-implemented method as set forth in claim 1, wherein the encoding of the paths of the elements of the XML data is performed by calculating frequencies of unique tags of the elements on the XML data, dividing a range [0.0, 1.0) into intervals using the calculated frequencies so that the intervals represents the respective tags, and reducing interval pn for a tag Pn using an interval for a path Q=P1 . . . Pn−1 wherein a path of an element e is P=P1 . . . ·Pn·.

3. The computer-implemented method as set forth in claim 1 or 2, wherein a path expression of the compressed XML document is converted into an interval on a range [0.0, 1.0) using reverse arithmetic encoding, and the path expression is processed using containment relationship between the interval of the path expression and the interval of the path of the element.

4. The computer-implemented method as set forth in claim 1, wherein statistical information per type is maintained so as to efficiently compress the respective data values according to types.

5. The computer-implemented method as set forth in claim 1, wherein, to differentiate the paths of the elements of the XML data and the data values of the XML data from each other, first bits of results of the encoding of the paths are set to 1 while first bits of results of the encoding of the data values are set to 0.

6. An XML compression apparatus, comprising:
   a computer readable storage medium having:
   a statistics collection unit for collecting information, including at least frequencies of respective tags of XML data, type information of data values, and data value-related statistical information;
   a type inference engine unit for inferring type information of data values of elements inductively according to tags of the elements having the data values with anyone among integer, real number, enumeration or string using an automatic data type inference engine algorithm without a document type definition of the XML data;
   a reverse arithmetic encoding unit for performing reverse arithmetic encoding on tags and paths of elements;
   a type dependent encoding unit for encoding the data values based on the inferred type information;
   a queriable compressed XML file output by the type dependent encoding unit;
   a display of at least one of the following: type dependent encoder, queries and compression ratios,
   wherein a variety of encoding techniques are applied to the compression of the data depending on the inferred data types, and numerical data, including integers and real numbers, are converted into numerical values through a binary encoder and compressed through a differential encoder so that size relationship between the numerical data values is maintained in encoded values, and thus, range queries using the numerical data are performed on the compressed XML data without partial data decompression.

7. The XML compression apparatus of claim 6, further comprising a search engine unit for searching a plurality of encoded data values of the queriable compressed XML file using tags.

8. The computer-implemented method as set forth in claim, further comprising outputting a queriable compressed XML file.

9. The computer-implemented method as set forth in claim 8, further comprising searching a plurality of encoded data values of said queriable compressed XML file using said tags.

10. The computer-implemented method as set forth in claim 1, wherein said computer-readable storage medium comprises a disk.

11. The XML compression apparatus of claim 6, wherein said computer-readable storage medium comprises a disk.

* * * * *

UNITED STATES PATENT AND TRADEMARK OFFICE
CERTIFICATE OF CORRECTION

PATENT NO. : 7,539,692 B2
APPLICATION NO. : 10/860292
DATED : May 26, 2009
INVENTOR(S) : Jun-Ki Min et al.

Page 1 of 1

It is certified that error appears in the above-identified patent and that said Letters Patent is hereby corrected as shown below:

Column 5, line 61, "P = $_{P1\ldots Pn}$" should read --P=$p_1 \ldots p_n$--.

Column 5, line 67, "Interval$_{Pn}$" should read -- Interval$_{p_n}$ --.

Column 5, line 67, "tag$_{Pn}$" should read -- tag$_{p_n}$ --.

Column 6, line 1, "Q=$_{P1\ldots Pn-1}$" should read --Q=$p_1 \ldots p_{n-1}$--.
Column 6, line 10, "P = $_{P1\ldots Pn}$" should read --P=$p_1 \ldots p_n$--.
Column 6, line 11, "P' = $_{P1\ldots Pn}$" should read --P' = $p_1 \ldots p_n$--.
Column 6, line 49, "E=//$_{P1}$/ . . . /$_{Pn}$" should read --E = //$p_1$/. . ./$p_n$--.
Column 6, line 51, "E' = //$_{Pl}$/. . ./$_{Pi}$" should read --E' = //$p_1$/. . ./$p_i$--.
Column 6, line 53, "E''=//$_{Pi+1}$/. . ./$_{Pn}$" should read --E'' = //$p_{i+1}$/. . ./$p_n$--.
Column 9, claim 2, lines 38-39, after "interval for a path", "Q=P1. . . Pn-1 wherein a path of an element e is P=P1 . . . Pn" should read --Q=$p_1 \ldots p_{n-1}$ wherein a path of an element e is P=$p_1 \ldots p_n$--.
Column 10, claim 8, line 39, "claim," should read --claim 1,--.

Signed and Sealed this

Tenth Day of November, 2009

David J. Kappos
*Director of the United States Patent and Trademark Office*